United States Patent
Zhang et al.

(10) Patent No.: US 10,877,221 B2
(45) Date of Patent: Dec. 29, 2020

(54) FIBER OPTIC CONNECTOR

(71) Applicant: Tyco Electronics (Shanghai) Co. Ltd., Shanghai (CN)

(72) Inventors: Haibo Zhang, Shanghai (CN); Zhigang Song, Shanghai (CN); Jinqiang Zhang, Shanghai (CN); Zhiyun Zhong, Dongguan (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 8 days.

(21) Appl. No.: 16/108,619

(22) Filed: Aug. 22, 2018

(65) Prior Publication Data

US 2019/0064449 A1  Feb. 28, 2019

(30) Foreign Application Priority Data

Aug. 23, 2017 (CN) .......................... 2017 1 0729354

(51) Int. Cl.
*G02B 6/36* (2006.01)
*G02B 6/38* (2006.01)
*G02B 6/00* (2006.01)
*G02B 6/44* (2006.01)

(52) U.S. Cl.
CPC ........... *G02B 6/3849* (2013.01); *G02B 6/381* (2013.01); *G02B 6/387* (2013.01); *G02B 6/3861* (2013.01); *G02B 6/3887* (2013.01); *G02B 6/4401* (2013.01); *G02B 6/3885* (2013.01)

(58) Field of Classification Search
CPC .. G02B 6/3897; G02B 6/4452; G02B 6/3887; G02B 6/387; G02B 6/3849; G02B 6/4444

USPC ...... 385/53, 58–60, 70–85, 88, 92, 134–139
See application file for complete search history.

(56) References Cited

U.S. PATENT DOCUMENTS

| 6,305,849 B1 * | 10/2001 | Roehrs ..................... B41J 2/175 385/59 |
| 6,790,081 B2 | 9/2004 | Burris et al. |
| 8,328,577 B1 | 12/2012 | Lu |
| 2016/0209599 A1 * | 7/2016 | Van Baelen ......... G02B 6/3887 |
| 2018/0045900 A1 * | 2/2018 | Zhong .................. G02B 6/3878 |

FOREIGN PATENT DOCUMENTS

| CN | 1327571 C | 7/2007 |
| CN | 102640357 A | 8/2012 |

OTHER PUBLICATIONS

Abstract of CN 102640357, dated Aug. 15, 2012, 1 page.

* cited by examiner

*Primary Examiner* — Kaveh C Kianni
*Assistant Examiner* — Hung Q Lam
(74) *Attorney, Agent, or Firm* — Barley Snyder

(57) ABSTRACT

A fiber optic connector comprises an outer housing, an inner housing installed in the outer housing, a fiber optic ferrule accommodated in the inner housing, an optical cable inserted into the inner housing and connected to the fiber optic ferrule, an elastic boot that is wrapped around both a connecting portion of the fiber optic ferrule connecting to the optical cable and a portion of the optical cable adjacent to the connecting portion, and a sealing structure. The sealing structure is disposed between a rear end portion of the outer housing and the elastic boot to provide a seal between the outer housing and the elastic boot.

20 Claims, 2 Drawing Sheets

FIBER OPTIC CONNECTOR

CROSS-REFERENCE TO RELATED APPLICATION

This application claims the benefit of the filing date under 35 U.S.C. § 119(a)-(d) of Chinese Patent Application No. 201710729354.3, filed on Aug. 23, 2017, the whole disclosure of which is incorporated herein by reference.

FIELD OF THE INVENTION

The present invention relates to a connector and, more particularly, to a fiber optic connector.

BACKGROUND

A fiber optic connector for outdoor use generally includes an outer housing, an inner housing installed in the outer housing, and a fiber optic ferrule accommodated in the inner housing. One end of an optical cable is inserted from rear ends of the outer housing and the inner housing into the fiber optic connector. A reinforcing element of the optical cable, such as a Kevlar fiber, is fixed to a rear seat of the fiber optic ferrule, and optical fibers of the optical cable are inserted into respective insertion holes in the fiber optic ferrule. Prior to mating with a mating fiber optic connector, the outer housing of the fiber optic connector is usually locked to a connecting seat that is typically hermetically mounted on a mounting panel.

In order to meet requirements for outdoor use, an existing outdoor fiber optic connector may have a waterproof sealing structure. However, the waterproof sealing structure of the existing outdoor fiber optic connector is usually designed only for the inner housing of the fiber optic connector; it is typical to only provide an elastic sealing ring between the inner housing and the rear seat of the fiber optic ferrule. No sealing structure is provided between the outer housing and the optical cable. Therefore, the existing outdoor fiber optic connector has low sealing reliability.

SUMMARY

A fiber optic connector comprises an outer housing, an inner housing installed in the outer housing, a fiber optic ferrule accommodated in the inner housing, an optical cable inserted into the inner housing and connected to the fiber optic ferrule, an elastic boot that is wrapped around both a connecting portion of the fiber optic ferrule connecting to the optical cable and a portion of the optical cable adjacent to the connecting portion, and a sealing structure. The sealing structure is disposed between a rear end portion of the outer housing and the elastic boot to provide a seal between the outer housing and the elastic boot.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
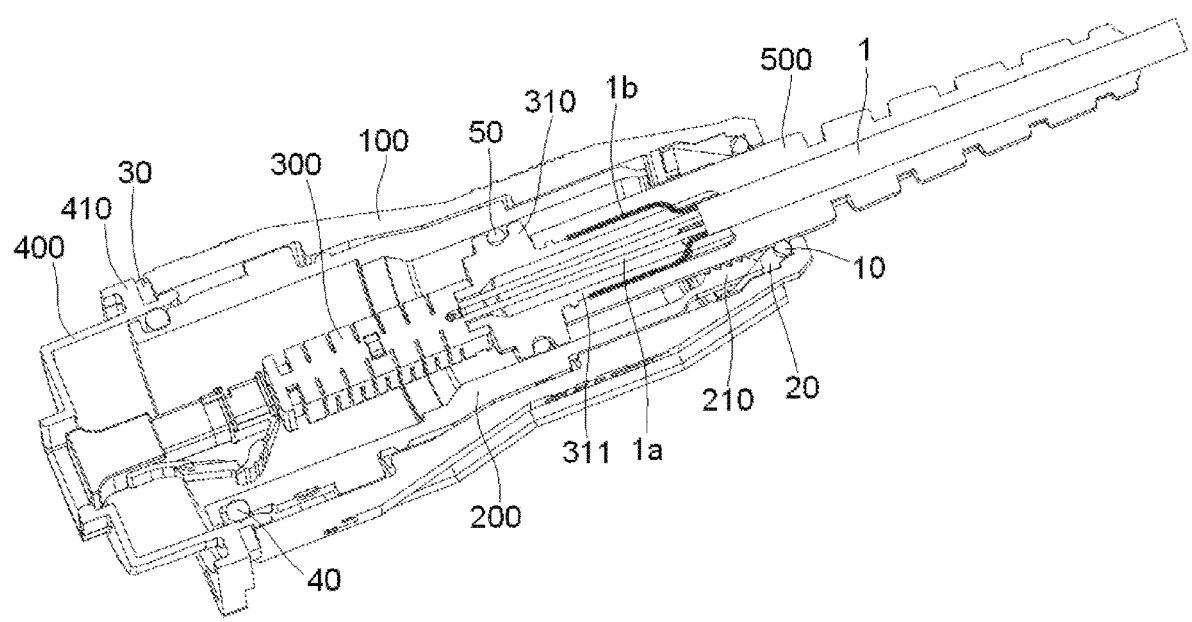
FIG. 1 is a sectional perspective view of a fiber optic connector according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 3:
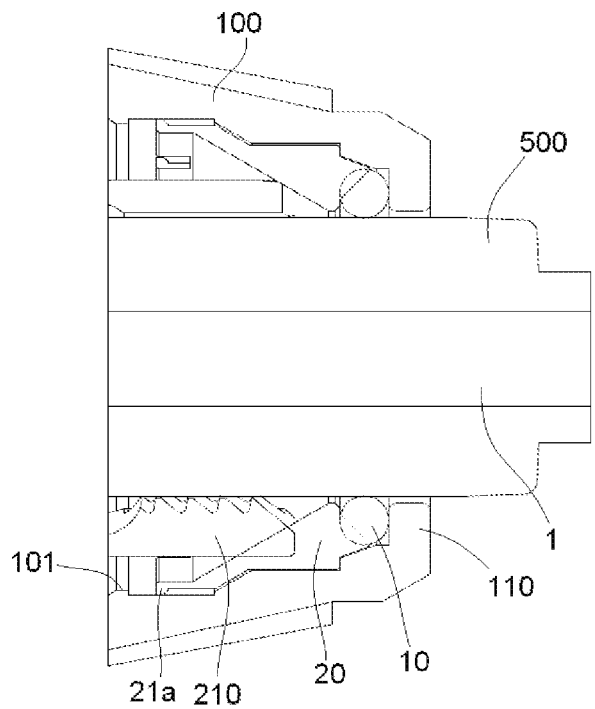
FIG. 3 is a sectional side view of a rear end portion of the fiber optic connector.

A fiber optic connector, as shown in FIGS. 1 and 3, includes an outer housing 100, an inner housing 200, a fiber optic ferrule 300, an optical cable 1, and an elastic boot 500. The outer housing 100 has a front end portion adapted to be locked to a connecting seat 400. The inner housing 200 is installed in the outer housing 100. The fiber optic ferrule 300 is accommodated in the inner housing 200 and is adapted to be connected with the optical cable 1. The optical cable 1 is inserted into the inner housing 200 and connected to the fiber optic ferrule 300. The elastic boot 500 is wrapped around both a connecting portion of the fiber optic ferrule 300 connecting to the optical cable 1 and a portion of the optical cable 1 adjacent to the connecting portion.

In an embodiment, the outer housing 100 may be of a split type including a front outer housing and a rear outer housing. The front outer housing is adapted to be locked to the connecting seat 400. The rear outer housing may be locked to the inner housing 200.

As shown in FIGS. 1 and 3, a sealing structure 10, 20 is disposed between a rear end portion of the outer housing 100 and the elastic boot 500 inserted into the fiber optic connector, so as to provide a seal between the outer housing 100 and the elastic boot 500. The sealing structure 10, 20 includes a snap ring 20 and an elastic boot sealing ring 10. The snap ring 20 and the elastic boot sealing ring 10 are disposed in the rear end portion of the outer housing 100. The elastic boot sealing ring 10 is located between the snap ring 20 and a rear end wall 110 of the outer housing 100. The elastic boot 500 is inserted from a rear end of the outer housing 100 and passes through the snap ring 20 and the elastic boot sealing ring 10.

As shown in FIGS. 1 and 3, after the inner housing 200 is installed in the outer housing 100, a rear end 210 of the inner housing 200 is pressed against the snap ring 20. When the front end portion of the outer housing 100 is locked to the connecting seat 400, the outer housing 100 generates an axial pressing force that urges the elastic boot sealing ring 10 forward. In this way, the elastic boot sealing ring 10 is sandwiched between the rear end of the snap ring 20 and the rear end wall 110 of the outer housing 100, and is brought in close contact with an outer peripheral surface of the elastic boot 500 and an inner surface of the rear end wall 110 of the outer housing 100. Thus, a seal between the outer housing 100 and the elastic boot 500 is achieved.

Figure 4:
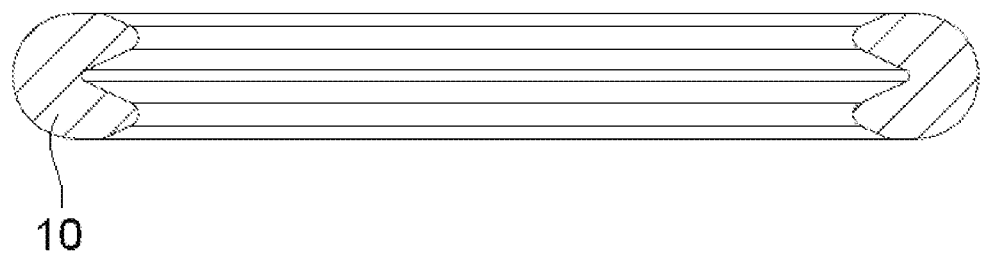
FIG. 4 is a sectional side view of an elastic boot sealing ring of the fiber optic connector.

As shown in FIG. 4, a V-shaped groove is formed in an inner surface of the elastic boot sealing ring 10 such that an inner side of the cross section of the elastic boot sealing ring 10 is substantially M-shaped. An outer side of the cross section of the elastic boot sealing ring 10 is approximately semicircular. The elastic boot sealing ring 10 with the illustrated and described shape achieves reliable sealing. In other embodiment, however, the entire cross section of the elastic boot sealing ring 10 may be substantially circular.

An annular protrusion 101 is formed on an inner surface of the outer housing 100, as shown in FIGS. 1 and 3. The annular protrusion 101 is configured to hold the snap ring 20 in the rear end portion of the outer housing 100, so as to prevent the snap ring 20 from being disengaged from the outer housing 100. Because the annular protrusion 101 is formed on the inner surface of the outer housing 100, it is possible to reliably hold the snap ring 20 in the rear end portion of the outer housing 100 before the inner housing 200 is installed in the outer housing 100. After the inner housing 200 is installed in the outer housing 100, the snap ring 20 may be retained in the rear end portion of the outer housing 100 by the rear end 210 of the inner housing 200.

Figure 2:
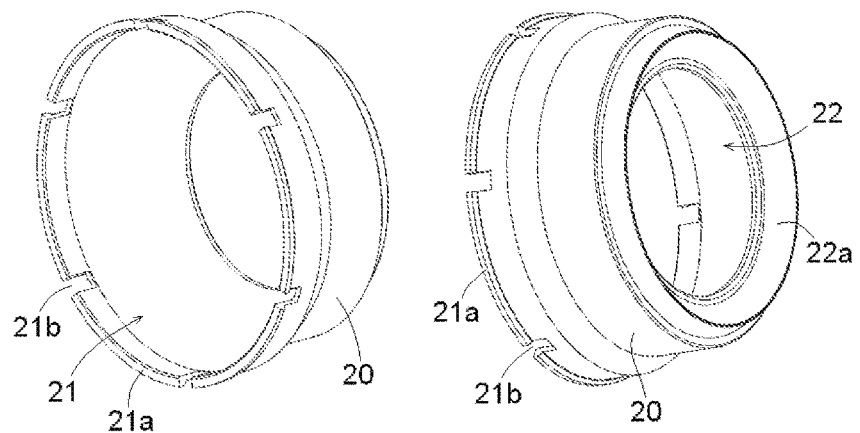
FIG. 2 is a perspective view of a snap ring of the fiber optic connector.

The snap ring 20, as shown in FIGS. 1-3, has a flared shape and has a front opening 21 and a rear opening 22. The diameter of the front opening 21 is greater than the diameter of the rear opening 22. An edge portion 21*a* at the front opening 21 of the snap ring 20 is slidable through the annular protrusion 101 in an axially rearward direction, but is not slidable through the annular protrusion 101 in an axially forward direction, thereby preventing the snap ring 20 from being disengaged from the outer housing 100. The front end of the snap ring 20 has a thickness less than other portions of the snap ring 20, and a plurality of notches 21*b* are formed on the edge portion 21*a* at the front opening 21 of the snap ring 20 so as to increase the elasticity of a front end portion of the snap ring 20, so that the edge portion 21*a* at the front opening 21 of the snap ring 20 is smoothly slidable through the annular protrusion 101.

The rear opening 22 of the snap ring 20, as shown in FIG. 2, has a conical inner surface 22*a* which is inwardly tapered. The conical inner surface 22*a* is pressed against the elastic boot sealing ring 10. The thickness of the rear end portion of the snap ring 20 is greater than the thickness of other portions of the snap ring 20.

As shown in FIGS. 1-3, optical fibers 1*a* of the optical cable 1 are inserted into respective insertion holes in the fiber optic ferrule 300, and a reinforcing element 1*b* of the optical cable 1, such as Kevlar fiber, is fixed to a rear end 311 of a tailstock 310 of the fiber optic ferrule 300. In an embodiment, a heat shrinkable tube may be sheathed on the reinforcing member 1*b* of the optical cable 1, and the heat shrinkable tube is heated to shrink on the rear end 311 of the tailstock 310, thereby fixing the reinforcing member 1*b* of the optical cable 1 to the rear end 311 of the tailstock 310.

As shown in FIG. 1, an elastic ferrule sealing ring 50 is provided between an outer surface of the tailstock 310 of the fiber optic ferrule 300 and the inner surface of the inner housing 200 to provide a seal between the fiber optic ferrule 300 and the inner housing 200.

As shown in FIGS. 1-3, when the front end portion of the outer housing 100 is locked to the connecting seat 400, a front end portion of the inner housing 200 is inserted into a rear end portion of the connecting seat 400. An elastic inner housing sealing ring 40 is provided between an outer surface of the front end portion of the inner housing 200 and an inner surface of the rear end portion of the connecting seat 400 to provide a seal between the inner housing 200 and the connecting seat 400.

As shown in FIGS. 1-3, an annular protruding wall 410 opposite to a front end surface of the outer housing 100 is formed on an outer surface of the connecting seat 400. An elastic outer housing sealing ring 30 is provided between the protruding wall 410 of the connecting seat 400 and the front end surface of the outer housing 100 to provide a seal between the outer housing 100 and the connecting seat 400.

What is claimed is:

1. A fiber optic connector, comprising:
   an outer housing;
   an inner housing installed in the outer housing;
   a fiber optic ferrule accommodated in the inner housing;
   an elastic ferrule sealing ring disposed between an outer surface of a tailstock of the fiber optic ferrule and an inner surface of the inner housing to provide a seal between the fiber optic ferrule and the inner housing;
   an optical cable inserted into the inner housing and connected to the fiber optic ferrule;
   an elastic boot that is wrapped around both a connecting portion of the fiber optic ferrule connecting to the optical cable and a portion of the optical cable adjacent to the connecting portion; and
   a sealing structure disposed between a rear end portion of the outer housing and the elastic boot to provide a seal between the outer housing and the elastic boot.

2. The fiber optic connector of claim 1, wherein the sealing structure includes a snap ring and an elastic boot sealing ring that are both disposed in the rear end portion of the outer housing, the elastic boot sealing ring located between the snap ring and a rear end wall of the outer housing.

3. A fiber optic connector comprising:
   an outer housing;
   an inner housing installed in the outer housing;
   a fiber optic ferrule accommodated in the inner housing;
   an optical cable inserted into the inner housing and connected to the fiber optic ferrule;
   an elastic boot that is wrapped around both a connecting portion of the fiber optic ferrule connecting to the optical cable and a portion of the optical cable adjacent to the connecting portion; and
   a sealing structure disposed between a rear end portion of the outer housing and the elastic boot to provide a seal between the outer housing and the elastic boot, the sealing structure including a snap ring and an elastic boot sealing ring that are both disposed in the rear end portion of the outer housing, the elastic boot sealing ring located between the snap ring and a rear end wall of the outer housing, wherein a rear end of the inner housing is pressed against the snap ring and the elastic boot is inserted from a rear end of the outer housing and passes through the snap ring and the elastic boot sealing ring.

4. The fiber optic connector of claim 3, wherein the outer housing is configured to generate an axial pressing force that urges the elastic boot sealing ring forward, so that the elastic boot sealing ring is sandwiched between a rear end of the snap ring and the rear end wall of the outer housing and is brought into close contact with both an outer peripheral surface of the elastic boot and an inner surface of the rear end wall of the outer housing.

5. The fiber optic connector of claim 3, wherein an annular protrusion is provided on an inner surface of the outer housing, the annular protrusion configured to hold the snap ring in the rear end portion of the outer housing so as to prevent the snap ring from being disengaged from the outer housing.

6. The fiber optic connector of claim 5, wherein the snap ring has a flared shape and has a front opening and a rear opening, the front opening having a diameter greater than the rear opening.

7. The fiber optic connector of claim 6, wherein an edge portion at the front opening of the snap ring is slidable through the annular protrusion in an axially rearward direction and is not slidable through the annular protrusion in an axially forward direction, so as to prevent the snap ring from being disengaged from the outer housing.

8. The fiber optic connector of claim 7, wherein a front end portion of the snap ring has a thickness less than other portions of the snap ring, and a plurality of notches are formed on the edge portion at the front opening of the snap ring so as to increase an elasticity of the front end portion of the snap ring, so that the edge portion at the front opening of the snap ring is smoothly slidable through the annular protrusion.

9. The fiber optic connector of claim 6, wherein the rear opening of the snap ring has a conical inner surface which is inwardly tapered, the conical inner surface being pressed against the elastic sealing ring.

10. The fiber optic connector of claim 9, wherein a rear end portion of the snap ring has a thickness greater than other portions of the snap ring.

11. The fiber optic connector of claim 1, wherein a plurality of optical fibers of the optical cable are inserted into a plurality of insertion holes in the fiber optic ferrule.

12. The fiber optic connector of claim 11, wherein a reinforcing member of the optical cable is fixed to a rear end of the tailstock of the fiber optic ferrule.

13. The fiber optic connector of claim 12, wherein a heat shrinkable tube is sheathed on the reinforcing member of the optical cable, and the heat shrinkable tube is heated to shrink on the rear end of the tailstock to fix the reinforcing member of the optical cable to the rear end of the tailstock.

14. A fiber optic connector, comprising:
an outer housing;
an inner housing installed in the outer housing, a front end portion of the inner housing is inserted into a rear end portion of a connecting seat when a front end portion of the outer housing is locked to the connecting seat;
a fiber optic ferrule accommodated in the inner housing;
an optical cable inserted into the inner housing and connected to the fiber optic ferrule;
an elastic boot that is wrapped around both a connecting portion of the fiber optic ferrule connecting to the optical cable and a portion of the optical cable adjacent to the connecting portion; and
a sealing structure disposed between a rear end portion of the outer housing and the elastic boot to provide a seal between the outer housing and the elastic boot.

15. The fiber optic connector of claim 14, wherein an elastic ferrule sealing ring is provided between an outer surface of a tailstock and an inner surface of the inner housing to provide a seal between the fiber optic ferrule and the inner housing.

16. The fiber optic connector of claim 14, wherein an elastic inner housing sealing ring is provided between an outer surface of the front end portion of the inner housing and an inner surface of a rear end portion of the connecting seat to provide a seal between the inner housing and the connecting seat.

17. The fiber optic connector of claim 14, wherein an annular protruding wall opposite to a front end surface of the outer housing is formed on an outer surface of the connecting seat.

18. The fiber optic connector of claim 17, wherein an elastic outer housing sealing ring is provided between the protruding wall of the connecting seat and the front end surface of the outer housing to provide a seal between the outer housing and the connecting seat.

19. The fiber optic connector of claim 2, wherein a V-shaped groove is formed in an inner surface of the elastic boot sealing ring.

20. A fiber optic connector, comprising:
an outer housing;
an inner housing installed in the outer housing and configured to receive a fiber optic ferrule and an optical cable connected thereto;
an elastic boot that is configured to wrap around both a connecting portion of the fiber optic ferrule connecting to the optical cable and a portion of the optical cable adjacent to the connecting portion; and
a sealing structure disposed between a rear end portion of the outer housing and the elastic boot to provide a seal between the outer housing and the elastic boot, the sealing structure including a snap ring and an elastic boot sealing ring that are both disposed in the rear end portion of the outer housing, the snap ring urged against the elastic boot sealing ring by a rear end of the inner housing.

* * * * *